Dec. 4, 1951  J. E. BRADLEY  2,577,565
SEED CLEANER
Filed Feb. 26, 1946  2 SHEETS—SHEET 1

Inventor
Joshua Ernest Bradley
By
W. Irvin Haskett
Attorney.

Dec. 4, 1951   J. E. BRADLEY   2,577,565
SEED CLEANER
Filed Feb. 26, 1946   2 SHEETS—SHEET 2
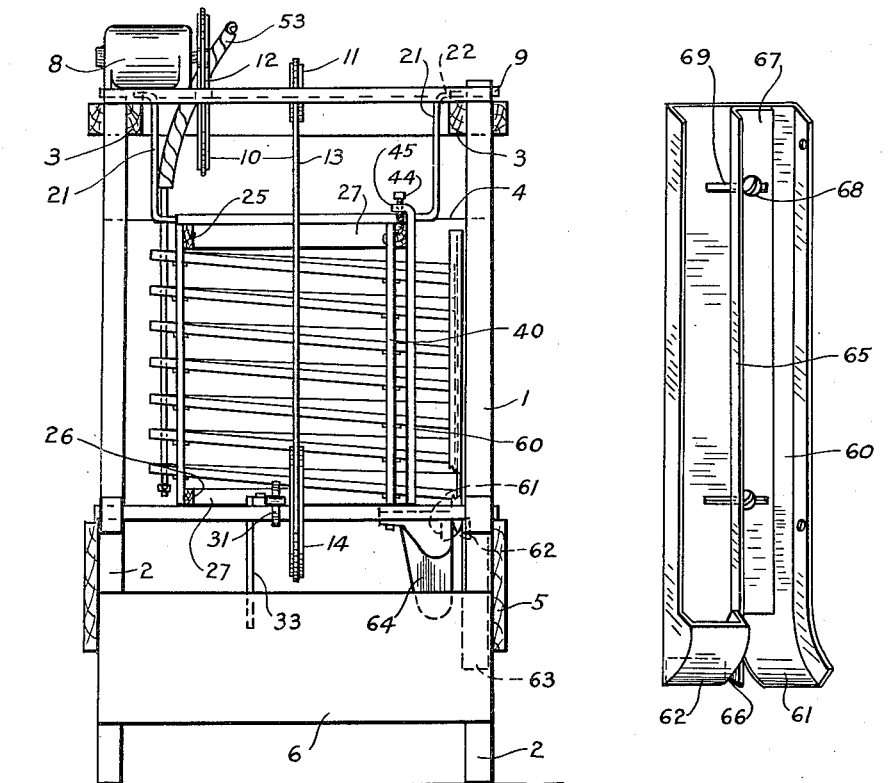
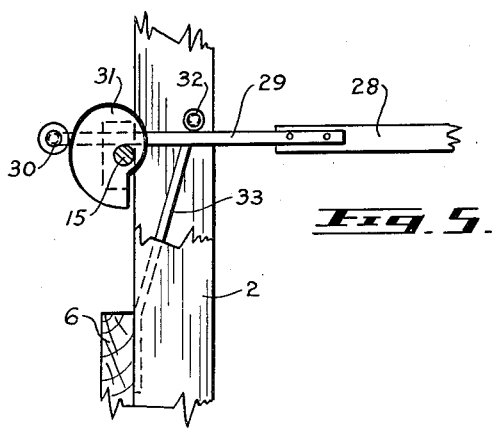
Inventor
Joshua Ernest Bradley Patented Dec. 4, 1951

2,577,565

UNITED STATES PATENT OFFICE 2,577,565

SEED CLEANER

Joshua Ernest Bradley, Stittsville, Ontario, Canada

Application February 26, 1946, Serial No. 650,342

2 Claims. (Cl. 209—112)

This invention relates to improvements in a seed cleaner and appertains particularly to a machine for separating seed from unwanted particles of closely approximating size and/or weight and/or shape as for instance oxeye daisy seed from timothy.

Another object of the invention is to provide a seed cleaner that will remove alsike clover, cockle, catchfly and other relatively elongated or flat sides seeds and such difficult-to-separate material as broken thistle and broken and hulled quack grass from roundish-shaped seed such as timothy by means of a machine comprising a plurality of sloping trays that are vibrated, shaken, jarred or reciprocated horizontally.

Another object of the invention is to provide a seed cleaning machine wherein the sloping vibrated trays may be tilted transversely at their lower ends with simple means for carefully and minutely adjusting the tilt.

Another object of the invention is to provide a seed cleaning machine with an improved feeding mechanism having flow control and tube cleaning means to assure an even and continuous supply at the desired rate of discharge to the several trays.

Another object of the invention is to provide an improved tray for such a seed cleaner and means for mounting the same in tiers so that the tilt of a whole vertical stack may be adjusted in unison while yet allowing of the insertion or removal of a single tray.

A further object of the invention is to provide a shaking tray type of seed cleaning machine having an adjustable divider for the discharge end of each stack of trays with chutes delivering respectively to the good seed trough and the unwanted material trough and wherein the former trough is supported with the shaking trays.

A still further object of the invention is the provision of a successful and highly efficient seed cleaner or like machine for separating various kinds of materials through the medium of horizontally vibrating trays that is characterized by structural simplicity and ruggedness, durability and operational economy and being capable of manufacture and use at reasonable cost whereby it is thereby rendered commercially desirable.

To the accomplishment of these and related objects as shall become apparent as the description proceeds, the invention resides in the construction, combination and arrangement of parts as hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 2 is an elevation of the upper or driving end thereof with the upper end rails removed;

Figure 4 is an enlarged perspective of the adjustable discharge chute for the front or lower end of each stack of trays; and Figure 5 is a detail of the cam and the engaging tongue of the shaker frame.

Figure 1:
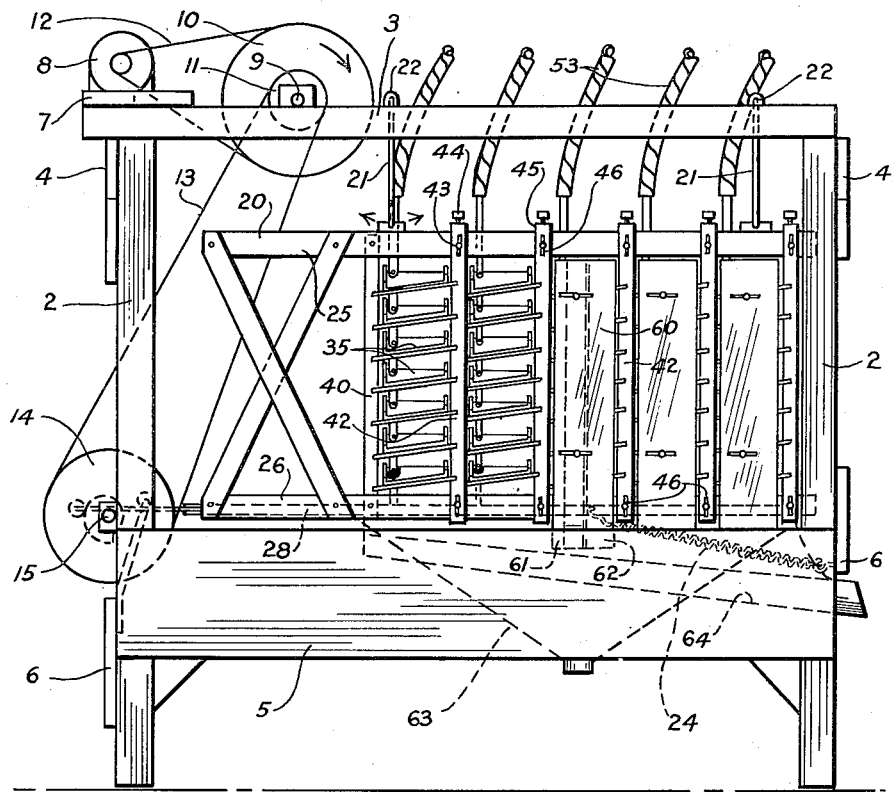
Figure 1 is a side elevation of a preferred form of my seed cleaning machine.
Figure 3:
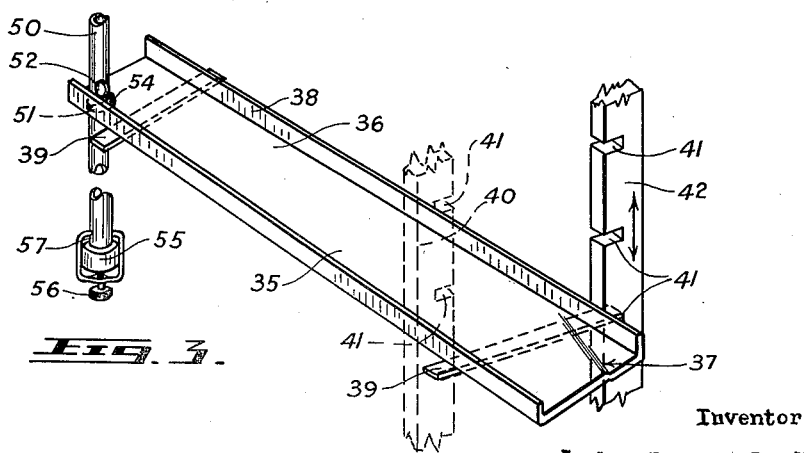
Figure 3 is an enlarged perspective view of one of the sloping trays showing the mechanism incidental to the mounting, feeding and tilting thereof.

This cleaner comprises essentially a general supporting structure such as the main frame 1 of substantially rectangular form having four corner posts 2, longitudinal rails 3 at the top on both sides, cross rails 4 near the top at both ends, side plates 5 near the bottom on both sides and cross plates 6 near the bottom at the upper or driving end and about ⅓ of the way up the opposite or lower end.

A platform 7 extends transversely of the upper end, being mounted on the opposite side rails 3 to support a small electric motor 8. In from this same end a transverse shaft 9 carries a pair of speed reducing pulleys 10 and 11, the former being driven by a belt 12 from the motor 8 while the latter which is the smaller connects by a belt 13 with a large pulley 14 on a horizontal transverse drive shaft 15 journalled lower down on the posts 2.

A longitudinally reciprocable inner frame 20 is slung within the main frame 1 by four corner hanger straps 21 pivotally suspended in bearing blocks 22 on the side rails 3. A number of strong retractile coil springs 24 between this swinging inner frame 20 and lower end of the main frame 1 constantly pull the swing frame 20 to that end where it strikes against the cross plate 6. This inner swinging or shaker frame 20 consists of vertically spaced upper and lower side rails 25 and 26 on each side and transverse spacing crossbars 27. The frame is reciprocated or shaken, as it swings on its hanger straps 21, by a longitudinally extending tongue 28 that attaches to the cross bar 27 at the lower or right-hand end of the swinging frame 20 or other suitable connecting support in that region. This tongue or pitman has a free-end extension 29 overlying the drive shaft 15 and is terminally bent horizontally at a right angle to carry a roller 30 that normally engages the outer side of the cam 31 on the drive shaft 15. An idling or guide roller 32 on the horizontally bent end of an arm 33, from the frame cross plate 6 holds the tongue extension 29 down. As the motor 8 drives the shaft 15 at a slow speed, the cam 31 through the tongue 28 pulls the swinging frame away from the lower end of the main frame and against the action of the coil springs 24 then suddenly releases it so that it swings back to strike smartly against the lower end cross plate 6.

A number of tiers or stacks of separating trays 35 are carried by this reciprocating inner frame 20. The trays each have a bottom plate 36 unbroken save for a brief shallow ridge 37 at an angle near the right side of the delivery end and a pair of side walls 38 along opposite sides. Each stack which may consist of a half dozen or more trays arranged one above the other and disposed with the trays extending transversely of the frame or at right angles to the direction of reciprocation. Each tray has a flat strip 39 across under the bottom 36 near each end, with that near the lower end lying at an angle to the transverse, and projecting a short distance out each side. The stacks of trays are supported by a pair of vertical holders at the back and another pair of similar holders 40 at the front or delivery end. The pairs of holders are supported by the rear and front upper and lower side rails 25 and 26 respectively and are spaced longitudinally of the frame just in excess of the width of the trays 35, being provided with vertically spaced notches 41 to receive the tray bottom cross strips 39. Except at the ends of the battery of stacks the rear holders may be notched on both sides to support the stacks of trays on either side where the tray bottoms lie horizontally. At the front, toward which the whole tray bottom slopes, the tray is also tilted longitudinally of the machine or transversely of the tray itself by raising the right edge of this delivering end; here the holder standard 40 on the left or down side attaches securely on the inside or back of the upper and lower frame rails 25 and 26 while the right holder standard 42 which in each case is vertically adjustable to vary the tilt applies on the outer side of these frame rails. Thus except at opposite ends of the battery of tray stacks these inner and outer holder standards 40 and 42 may overlap, being placed directly behind one another with the same fastening pin 43 holding both. It is because of this staggered arrangement of the front holder standards 40 and 42 that the front strips 39 run across under the trays at an angle. Each stack of trays 35 is held assembled in vertical registry by the projecting ends of their cross-strips 39 seating in the notches in these holder standards 40 and 42 and the stacks are held against displacement transversely of the machine by clinching or dog-earing the corners of the projecting ends of the cross strips of the top and bottom trays only, after they have seated in their respective notches 41, since the stacks or sets of trays are also held assembled by a feeding pipe to be presently mentioned. The vertical adjustment of the front right standard holder 42 of each stack to vary the cross tilt of the trays is by a screw 44 threaded through a backwardly bent angular continuation 45 of the holder that overlies the front top rail 25. The holder is normally held stationary by the fastening screws 43 extending through elongated vertical slots 46 into the upper and lower side rails 25 and 26 and that serve also to hold the overlapping holders in the rear. To adjust the holders 42, the screws 43 are just loosened and the take-up screw 44 turned to raise or lower the holder to the desired degree when the fastening pins 43 are again tightened.

Seed is fed to the several trays in a stack by means of a vertical feed tube or pipe 50 extending through the whole stack, each tray 35 having an accommodating bore 51 near its back left corner to pass the same. Just above each tray bottom the pipe has a circular outlet opening 52 through which the seed, fed to the pipe through flexible conduits 53 from a supply hopper (not shown) pass onto the tray. The pipe 50 is rotatably adjustable so that the direction of openings angle may be varied to control the amount of seed delivered to the trays and the pipe 50 is supported in the tray stack by a collar 54 immediately overlying the bottom-most tray that is suitably secured to the pipe as by a set screw. A clean-out cap or closure 55 for the open lower end of the pipe is held thereto by a locking screw 56 threaded upwards in a swinging bail 57.

The low forward or delivery ends of the stacks of trays 35 are covered in by a discharge chute 60 formed as a vertical channel of a width that its walls overlie the sides of the trays 35. It is supported by the top and bottom trays of each stack and only on the left or lower side where the adjacent channel wall is suitably attached to the said top and bottom trays. This allows the right and upper side of the tilted delivery end of the trays to be freely adjusted vertically. At the bottom the chute 60 is divided to form inwardly and outwardly deflecting mouths 61 and 62 respectively, the former opposite the left or lower side of the tray and the latter on the right or upper side and having its mouth formed by an angular continuation of the side wall paralleling the face or body of the channel and offset to underlie the bottom of the lower-most tray. This specially formed mouth 62 on the right spills outwardly into a centrally directed funnel 63 while the inwardly deflecting mouth 61 for the portion of the chute 60 opposite the lower left side of the trays 35 spills into an elongated trough 64 suspended from the under side of the shaker frame 20 and declines to the outlet end just beyond the right end of the machine. An adjustable divider 65 extends vertically down the inside of the channel chute 60 being of a depth to just engage the ends of the trays 35, its lower end 66 which is flexible lying between oppositely deflecting mouths 61 and 62. This divider attaches to the channel by an angular fin 67 through which nut and bolt assemblies 68 pass that are slidably adjustable in the horizontal slots 69 in the base of the channel chute 60.

In use as the shaker frame 20 is reciprocated slowly by the motor-driven cam 31, its sharp striking under spring action against the main frame imparts a unique vibration to the stacks of trays onto which seed is flowing at the desired rate through the perforated feed pipes. Travelling generally down the length of the sloping trays 35, at right angles to the direction of reciprocation, the shaking of the trays causes the seed to separate, the good grain seed following down the left or lower side while the weed seeds and other unwanted material climbs to the upper side of the tray and being finally caught by the impressed ridge at delivery end with the good grain seed and unwanted material falling off the end of the trays into opposite sides of the divided channel chute 60 from which the good grain seed is discharged by the inturned mouth 61 into the delivery chute 64 carried under the shaker frame down which it flows to the outlet.

From the foregoing description taken in connection with the accompanying drawings, it will be manifest that a seed cleaner is provided that will fulfil all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings shall be interpreted as illustrative and not in a limitative or restrictive sense.

I claim:

1. A seed cleaning machine comprising a main supporting structure, a shaker frame slung therefrom having front and rear pairs of upper and lower horizontal rails respectively, a longitudinally separated pair of vertical standards between the rear pair of vertically spaced rails and another longitudinally spaced pair of vertical standards between the forward pair of vertcially spaced rails, a stack of vertically spaced forwardly sloping trays disposed transversely of said frame and supported between said standards, vertical adjusting means for one of the forward standards whereas the remaining standards are fixed, seed supplying means for the rear upper end of said trays, and a discharge chute for the forward end of said stack of trays attached only to the side of said trays opposite the standard having said vertical adjusting means.

2. A seed cleaning machine comprising a main supporting structure, a shaker frame slung therefrom having front and rear pairs of upper and lower horizontal rails respectively, a longitudinally separated pair of vertical standards between the rear pair of vertically spaced rails and another longitudinally spaced pair of vertical standards between the forward pair of vertically spaced rails, vertically spaced, horizontal notches in confronting sides of the pairs of standards, a stack of vertically spaced forwardly sloping trays disposed transversely of said frame, cross strips underlying and supporting the trays near both front and rear thereof with their projecting ends seating in the notches of said standards, vertical adjusting means for one of the forward standards whereas the remaining standard are fixed and whereby the forward delivery end of the trays may be twisted, seed supplying means for the rear upper end of said trays, and a discharge chute across the tiltable forward delivery end of said trays.

JOSHUA ERNEST BRADLEY.

REFERENCES CITED

The following references are of record in the file of this patent:

UNITED STATES PATENTS

| Number | Name | Date |
|---|---|---|
| 62,602 | Buckminster | Mar. 5, 1867 |
| 427,607 | Sinderson | Oct. 6, 1885 |
| 667,514 | Frey | Feb. 5, 1901 |
| 696,058 | Lehrritter | Mar. 25, 1902 |
| 758,907 | Fraser et al. | May 3, 1904 |
| 998,439 | Wilford | July 18, 1911 |
| 1,075,959 | Audet | Oct. 14, 1913 |
| 1,197,398 | Richards | Sept. 5, 1916 |
| 1,525,718 | Charlton | Feb. 10, 1925 |
| 1,569,451 | Bonine | Jan. 12, 1926 |
| 1,622,386 | Ladd | Mar. 29, 1927 |
| 1,686,374 | Franks | Oct. 2, 1928 |
| 1,737,818 | Welty | Dec. 3, 1929 |
| 1,964,716 | Ater | July 3, 1934 |
| 2,243,797 | Franks | May 27, 1941 |